Fig. 4.

April 16, 1929.  T. U. WHITE  1,708,989
SIGNALING SYSTEM
Filed Dec. 15, 1924   7 Sheets-Sheet 6

Fig. 6.

WITNESSES:  INVENTOR
  Thomas U. White
BY
  ATTORNEY

April 16, 1929.  T. U. WHITE  1,708,989
SIGNALING SYSTEM
Filed Dec. 15, 1924  7 Sheets-Sheet 7

Fig. 7.

INVENTOR
Thomas U. White

Patented Apr. 16, 1929.

1,708,989

UNITED STATES PATENT OFFICE.

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA.

SIGNALING SYSTEM.

Application filed December 15, 1924. Serial No. 755,812.

My invention relates, in general, to signaling systems and more particularly to systems by which remotely-disposed electrical apparatus may be supervised and controlled from a central point or dispatcher's office.

One object of my invention is to provide means under the control of the dispatcher for controlling the charging of a battery located at a remote station.

Another object of my invention it to provide means for apprising the dispatcher of the condition of this battery by means of a code of impulses.

Another object of my invention it to provide means under the control of the dispatcher for opening the charging circuit of the battery whenever he so desires.

A still further object of my invention is to notify the dispatcher when the voltage of the battery falls below a certain allowable value.

There are other features of my invention, which together with those set forth, will be described hereinafter with reference to the accompanying drawings.

Referring now to the drawings, comprising Figures 1 to 7, inclusive, I have shown by means of conventional diagrams sufficient of the circuits and apparatus to enable my invention to be readily explained and understood.

Figures 1 to 7, inclusive, when placed side by side with the corresponding lines at the ends thereof in alinement, illustrate the circuits of my complete system. Figs. 1, 6 and 7 are diagrammatic views of the equipment located in the load dispatcher's office, while

Figure 1:
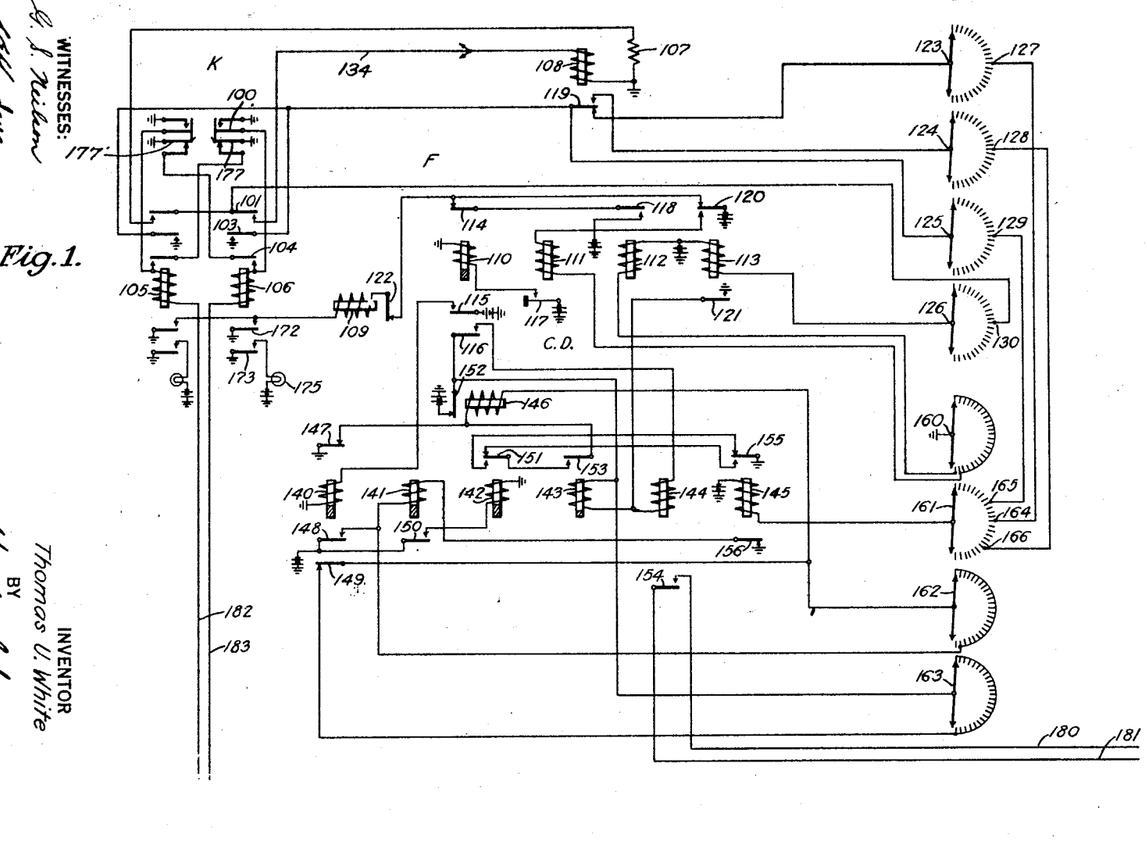

Referring now more specifically to Fig. 1, in the upper left-hand corner thereof is shown a key K. This key is one of several groups of keys and is of the ordinary double-throw type. A switch F is a finder switch of the usual rotary type, the wipers of which move in a forward direction only. The finder switch is provided with four wipers 123 to 126, inclusive, each of which is adapted to engage a contact bank comprising twenty-five contact members. The wipers of the switch F have no normal position. The switch CD is a code-sending switch similar in mechanical construction to the finder switch F. On account of differences in circuit design, the switch CD is rotated to normal position at the end of each operation.

Figure 2:
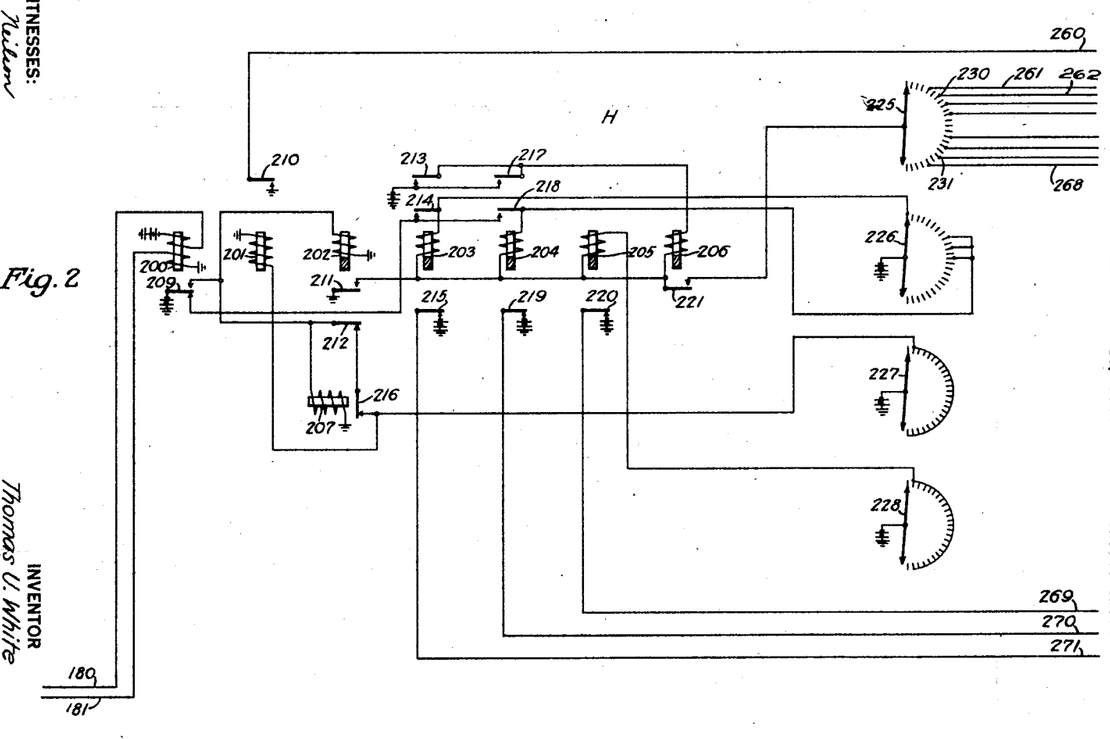
Figs. 2, 3, 4 and 5 are similar views of the selective and controlling equipment in an automatic substation.

In Fig. 2, there is shown a connector switch H. This switch is of the same mechanical construction as the finder switch F. However, its circuits have been so designed as to enable it to be directively controlled.

Figure 3:
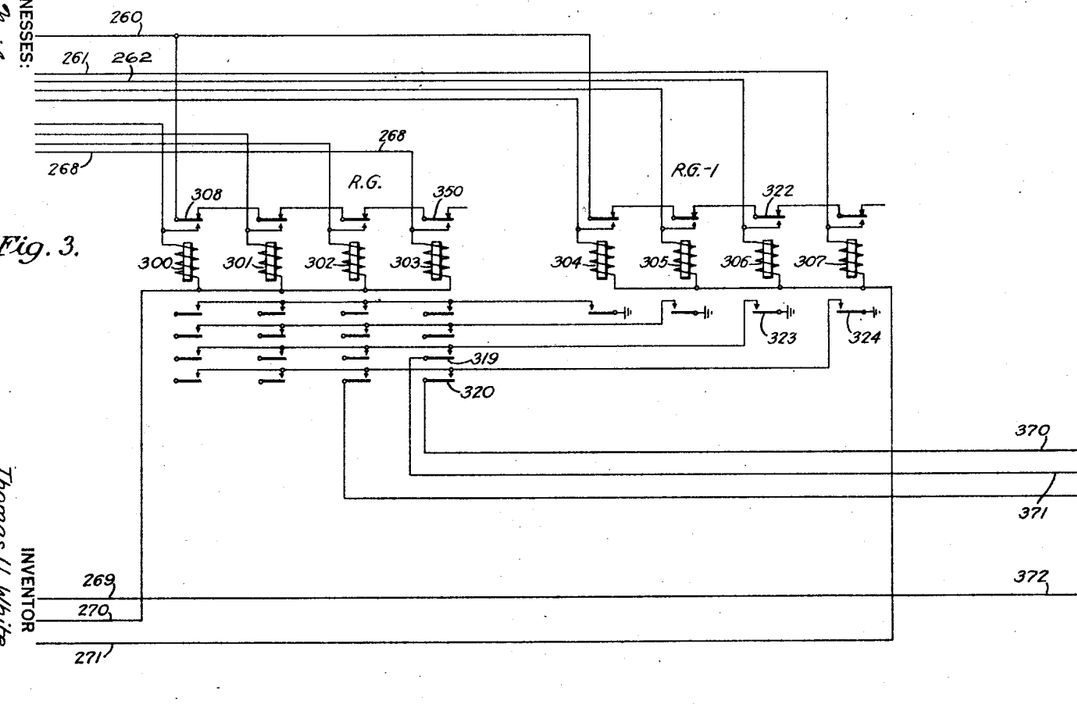

Fig. 3 shows two groups RG—1 and RG of selecting relays, the relay group RG—1 being the tens selecting group and the relay group RG being the units selecting group.

Figure 4:
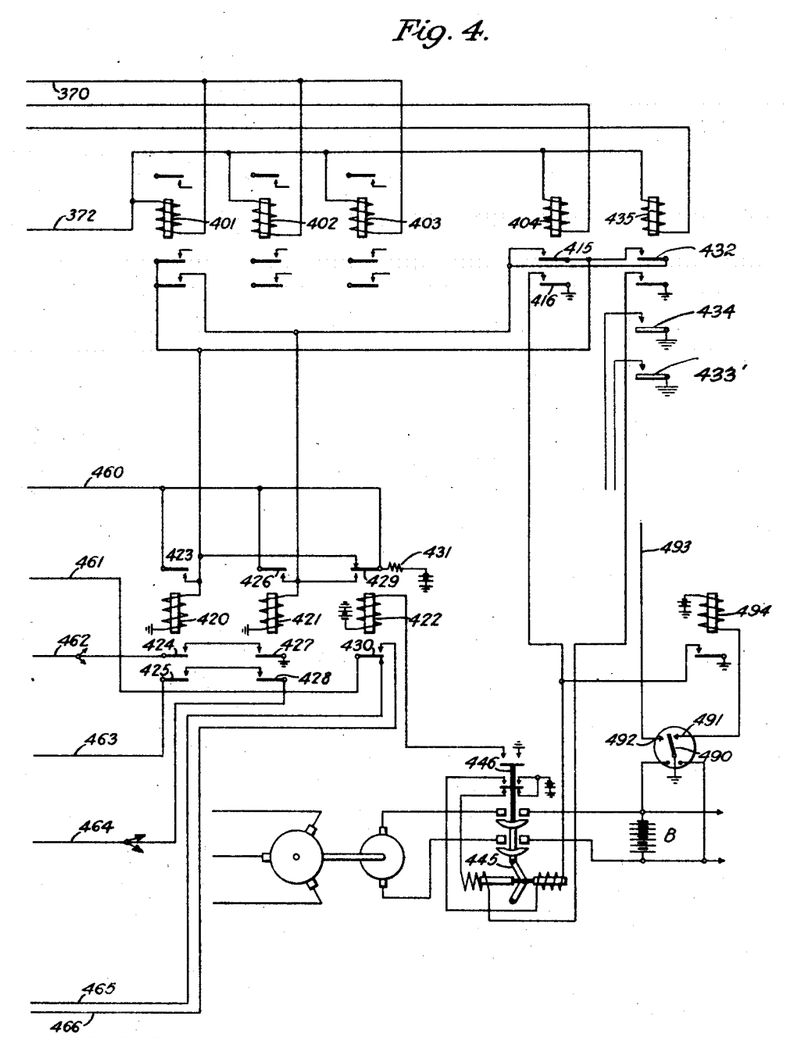

The relays 401 to 404, inclusive, in Fig. 4, are those selected by the operation of the selective relays of Fig. 3. The contactor 445 may be any one of the contactors in the substation. The relays 420 to 422, inclusive, are provided for the purpose of controlling the operation of the finder switch F—1 of Fig. 5, in accordance with the position of the contactor 445.

Figure 5:
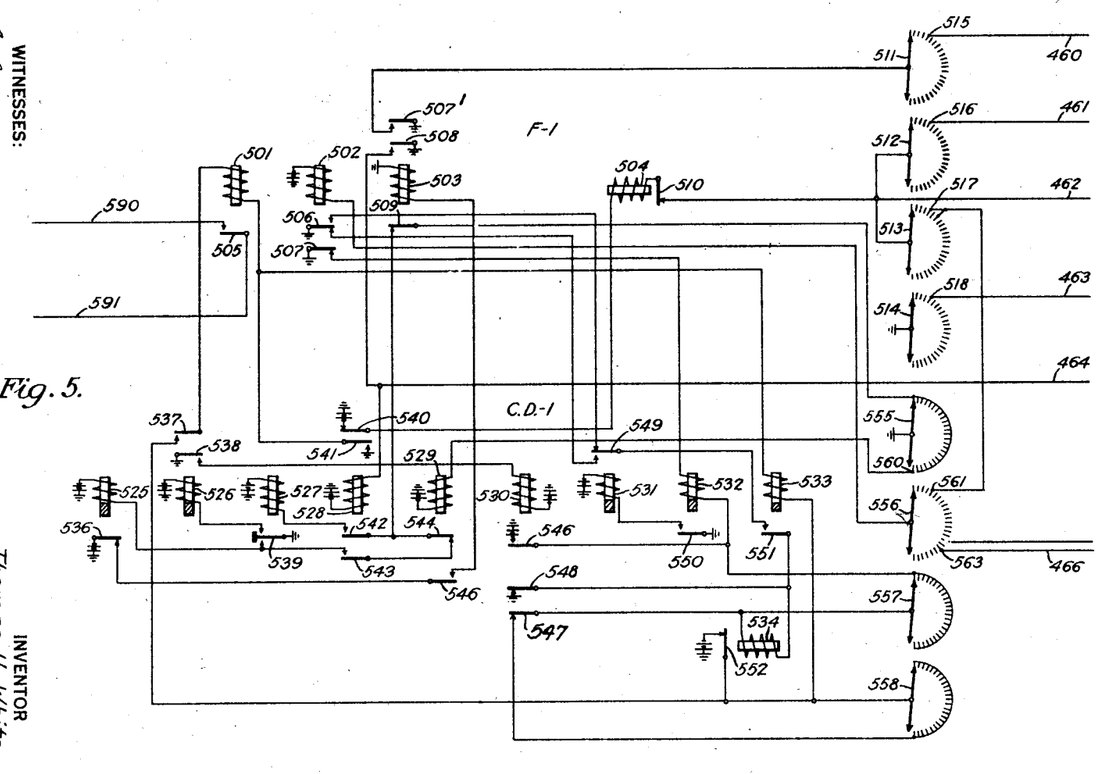

In Fig. 5 is shown a finder switch F—1 and a code-sending switch CD—1. These switches are very similar to the switches F and CD previously described.

Figure 6:
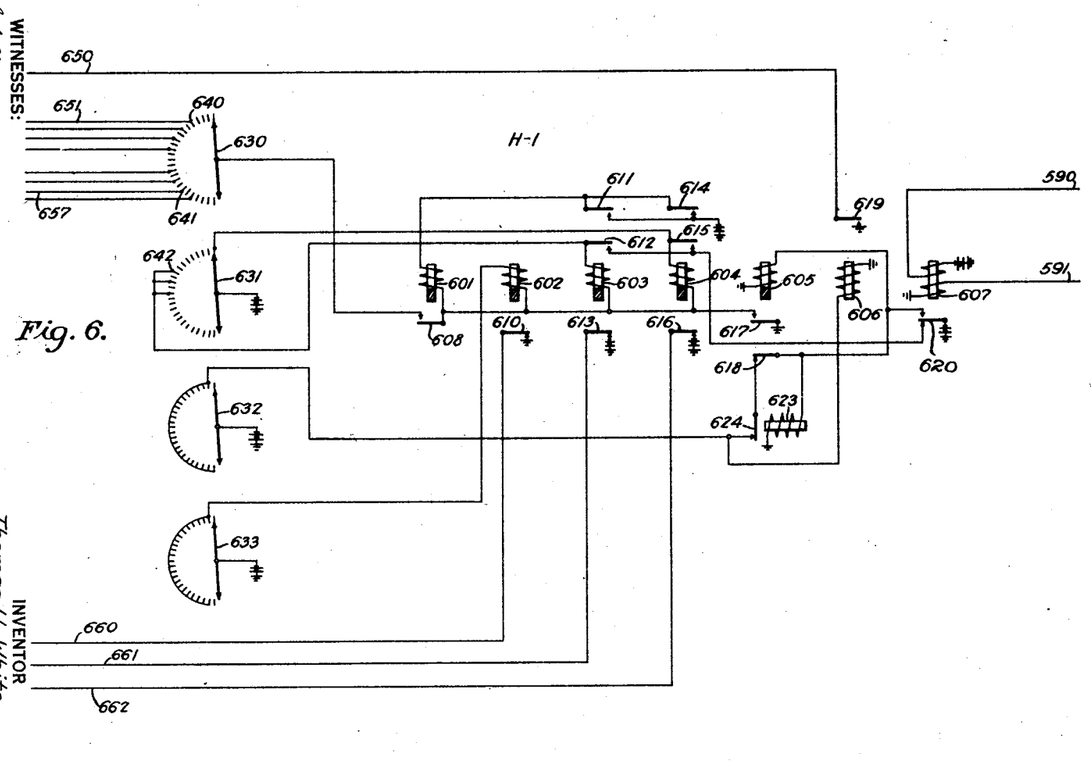

In Fig. 6 is shown a connector switch H—1 similar to the connector switch H described above.

Figure 7:
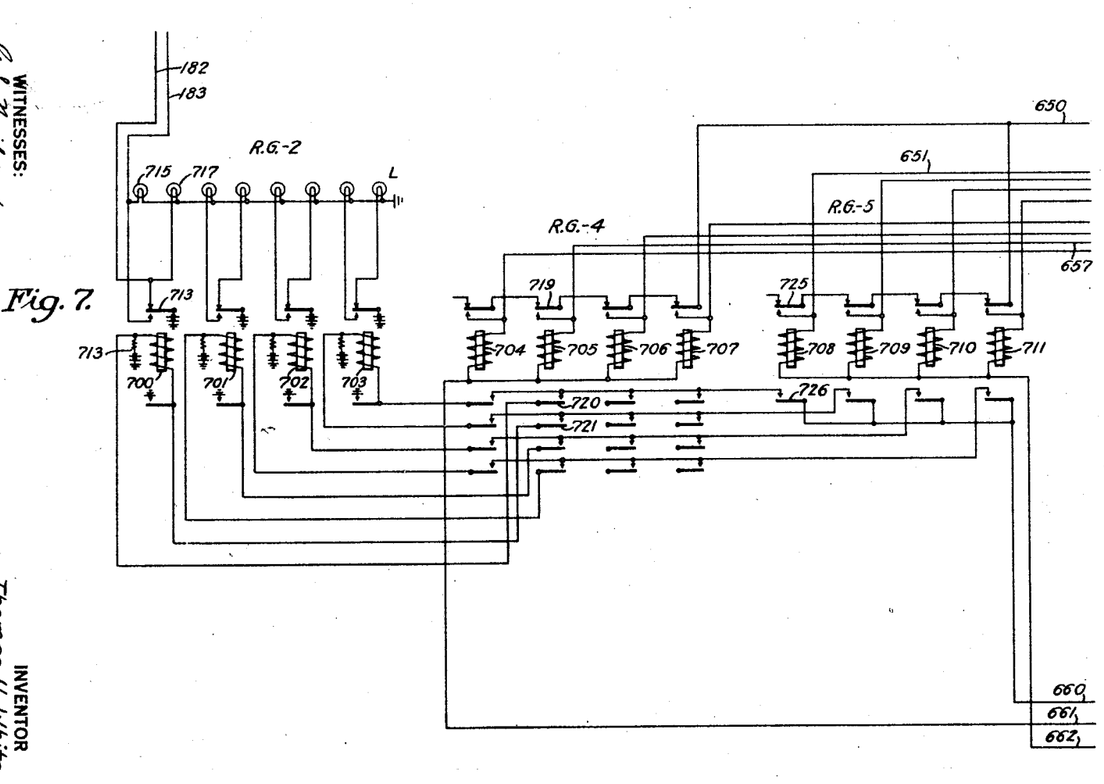

The relay groups RG—4 and RG—5, shown in Fig. 7, are selective relays similar to those shown at RG and RG—1, Fig. 3. The relays 700 to 703, inclusive, control the operation of the supervisory lamps L.

Having briefly described the apparatus shown in the drawings, I will now describe its detailed circuit operation. In order to do this, it may be assumed that the circuit interrupter 445 is closed by the operator at the station.

When the circuit breaker 445 is operated, a circuit is closed that may be traced from ground by way of spring 446, and through the winding of the relay 422 to battery. The relay 422 is energized by this circuit and, upon operating, its armature 429 closes a circuit for the relay 421. The relay 421 is energized and attracts its armatures. Prior to this time, the relay 420 has been energized as a result of the relay 422 being inoperative. When the relay 422 was energized, the relay 420 did not retract its armatures, because of the fact that it had established a locking circuit or holding circuit for itself at armature 423.

When the relay 421 is energized, it operates to establish a locking circuit for itself at armature 426 and to close a circuit that may be traced from ground by way of armature 427 and its front contact, front contact and armature 424, common conductor 462, front contact and armature 510, winding of stepping magnet 504, and to battery by way of back contact and armature 540 of relay 528. The stepping magnet 504 is immediately energized to place its pawl in position to actuate the switch shaft upon its deenergization and, at armature 510, opens its own circuit. As the magnet 504 interrupts its own circuit, it intermittently operates to advance the switch wipers 511 to 514, inclusive, step by step, until said wipers are brought into engagement with the bank contact members 515 to 518, inclusive. In this position, a circuit is completed extending from ground by way of wiper 514 and its associated bank contact 518, conductor 463, armature 425 and its front contact, front contact and armature 428, common conductor 464, and winding of relay 528 to battery. The relay 528 is immediately operated over this circuit.

As a result of the energization of the relay 528, the circuit of the stepping magnet 504 is opened at armature 540, and at armature 541 a circuit is completed that extends from ground by way of said armature and its front contact, winding of slow-acting relay 533, and back contact and armature 552 to battery.

Another result of the energization of the relay 528 is that a circuit is closed through ground by way of wiper 555 and its associated bank contact, armature 509 and its back contact, armature 542 and its front contact, and winding of relay 527 to battery. Another circuit in parallel with that described above, except that it goes by way of armature 544 and its back contact, and armature 543 and its front contact, may be traced for energizing the relay 525. The relay 527, upon operating, at its armature 539 closes a circuit for the relay 526.

At this point, the peculiar construction of the armature 539 of the relay 527 may be noted. The armature 539 is weighted and is so constructed that, when the relay 527 is deenergized, the armature 539 vibrates for some time on account of its momentum. The adjustment between the front and the back contacts is so made that the armature 539, in decreasing the amplitude of its operation, first permanently opens the circuit of the relay 525. The operation of the relay 525 is without particular function at the present time. The relay 526, upon operating, at its armature 538 closes a circuit for the relay 530 and at its armature 537 establishes a circuit that extends from ground by way of armature 541 and its front contact, winding of repeating relay 501, armature 537 and its front contact, and to battery by way of back contact and armature 552 on the stepping magnet 534 of the code-sending switch CD—1.

The relay 530 is energized from the previously traced circuit, and, upon operating, it closes a circuit at armature 546 that extends from battery by way of front contact and armature 546, winding of slow-acting relay 532, and back contact and armature 507 to ground. The relay 532, upon operating, at armature 550 closes a circuit for the slow-acting relay 531. By the operation of the relay 531, a circuit is completed that extends from ground by way of armature 506 and its back contact, front contact and armature 549, front contact and armature 551, winding of magnet 534, wiper 557 and its associated bank contact, and armature 546 and its front contact to battery. The magnet 534 is energized over this circuit and it operates to place its pawl in such position as to operate the switch shaft upon its deenergization. Another result of the energization of the magnet 534 is that the circuit of the slow-acting relay 533 is opened as is, also, the circuit of the repeating relay 501.

When the circuit of the relay 501 is closed, as previously described, this relay operates. As a result of this operation, a circuit is closed over the trunk conductors 590 and 591 for the line relay 607 of the connector switch H—1. Upon operating, the relay 607, through its armature 620, completes a circuit for the slow-acting relay 605 in parallel with the stepping magnet 623. Upon attracting its armature, the relay 605 closes a circuit for the slow-acting relay 604 at its armature 617. The relay 604, upon operating its armature 615, prepares a holding circuit for itself, removes battery from the conductor 661 at armature 616, and at armature 614, closes a circuit for the slow-acting relay 601. The energization of the relay 601 merely prepares certain circuits which function later. The energization of the magnet 623 places its pawl in position to operate the switch shaft upon the deenergization of the magnet.

When the circuit of the repeating relay 501 in the code-sending switch CD—1 is opened, by the energization of the magnet 534, previously described, this relay is deenergized to open the circuit of the line relay 607 of the connector H—1. The deenergization of the line relay 607 opens the circuit of the slow-acting relay 605 and also the circuit of the magnet 623. The retraction of the armature of the magnet 623 causes its associated pawl to advance the switch shaft carrying the switch wipers 630 to 633, inclusive, into engagement with the first set of bank contacts.

The operation of the connector H—1 from its normal position closes a circuit for the relay 606. The relay 606, upon operating, places ground upon the conductor 650 at armature 619.

Referring to the code-sending switch CD—1, it will be remembered that the energization of the stepping magnet 534 also opened the circuit of the slow-acting relay 533. After a short interval, this relay deenergizes and opens the circuit of the stepping magnet 534 at armature 551. The magnet 534 immediately deenergizes to advance the wipers 555 to 558, inclusive, into engagement with the first set of bank contacts and, at armature 552, closes the circuit of the repeating relay 501 and also the circuit of the relay 533. The relay 533 energizes to close the circuit of the stepping magnet 534 and the repeating relay 501 energizes to close the circuit of the line relay 607 of the connector H—1. The alternate operation of the slow-acting relay 533 and the stepping magnet 534 continues until the wipers 555 to 558, inclusive, are brought into engagement with the bank contact set which includes the contact 561. When this occurs, a circuit is completed extending from ground by way of armature 427 and its front contact, front contact and armature 424, common conductor 462, wiper 513, bank contact 517, bank contact 561, wiper 556, and winding of relay 502 to battery.

The relay 502 is energized over this circuit and operates, at armature 506, to open the circuit of the stepping magnet 534 and to prepare another circuit at the front contact of this armature for said magnet. An additional result of the operation of the relay 502 is that the circuit of the slow-acting relay 532 is opened at armature 507. After a short interval of time, the relay 532 is deenergized to open the circuit of the slow-acting relay 531. Upon the retraction of the armature 549 of the relay 531, a circuit is completed that extends from ground by way of armature 506 and its front contact, back contact and armature 549, front contact and armature 551, winding of stepping magnet 534, wiper 557 and its associated bank contact, and armature 546 and its front contact to battery.

The magnet 534 is energized over this circuit and actuates its armatures, to position its associated pawl, to open the circuit of the slow-acting relay 533, and also to open the circuit of the repeating relay 501. The slow-acting relay 533 is deenergized, after an interval, to open the circuit of the stepping magnet 534, which is deenergized, to again close the circuit of the slow-acting relay 533 and to open the circuit of the repeating relay 501. The alternate operation of the relay 533 and the magnet 534 again occurs until the wipers 555 to 558, inclusive, are advanced into engagement with the bank contact set which includes the bank contact 563.

During the operation of the code-sending switch CD, while its wipers were rotated in search of the contact set which includes the bank contact 561, the circuit of the relay 501 was intermittently opened and, consequently, the circuit of the line relay 607 of the connector H—1 was likewise opened. It is true that the circuit of the slow-acting relay 533 indirectly controls the speed of the operation of the repeating relay 501. It is also true that, at each deenergization of the relay 607, the circuit of the slow-acting relay 605 is opened. In order to obviate any false operation, which would occur were the relay 605 to be deenergized between deenergizations of the relay 533 in the switch CD—1, the time constant of the slow-acting relay 533 is materially faster than the time constant of the slow-acting relay 605.

Each time the circuit of the line relay 607 is opened, this relay is deenergized to open the circuit of the slow-acting relay 605 and also the circuit of the stepping magnet 623. The magnet 623 is thus deenergized a plurality of times to advance the wipers 630 to 633, inclusive, into engagement with the bank contact set which corresponds to the number of impulses sent over the trunk line, as determined by the number of steps that the code-sending switch CD has taken to find the bank contact set including the contact 561. It will be assumed that this bank contact set selected by the connector H—1 includes the contact 640.

As the wipers of the connector H—1 have been rotated past the normal set of bank contacts, the original energizing circuit of the slow-acting relay 604 is opened. However, the relay 604 is not deenergized until the termination of the first series of impulses. This result is due to the fact that, at each retraction of the armature of the line relay 607, a circuit is closed for the relay 604.

By the deenergization of the relay 604 at the end of the first series of impulses, the circuit of the slow-acting relay 601 is opened at armature 614, and a circuit is closed at armature 616 that extends from battery by way of conductor 662, winding of relay 708, conductor 651, bank contact 640, wiper 630, front contact and armature 608, and front contact and armature 617 to ground. The relay 708 is energized over this circuit and operates to open the locking circuits of certain relays in the group RG—5 at armature 725, to close its locking circuit at the front contact of armature 725 to ground on conductor 650, which has been previously grounded by the operation of the relay 606.

Another result of the energization of the relay 708 is that, at armature 726, a selecting circuit is prepared.

Returning to the operation of the code-sending switch CD—1, when the wipers 555 to 558, inclusive, are brought into engagement with the bank contact set that includes the contact 563, as previously described, a circuit is completed that extends from ground by way of armature 427 and its front contact, front contact and armature 424, common conductor 462, wiper 512, bank contact 516, conductor 461, armature 430 and its front contact, conductor 466, bank contact 563, wiper 566, and winding of relay 502 to battery.

The relay 502 is energized over the above-traced circuit and it operates, as before, to open the circuit of the stepping magnet 534 at armature 506 and to open the circuit of the slow-acting relay 532 at armature 507. The slow-acting relay 532 is deenergized to open the circuit of the slow-acting relay 531, which also retracts its armature. As a result of the latter operation, the stepping magnet 534 is operated to open the circuit of the interrupter relay 533, which retracts its armature to open the circuit of the stepping magnet 534. The magnet 534 is thus deenergized to advance the switch wipers 555 to 558, inclusive, into engagement with the next set of bank contacts. As a result of this operation, the circuit of the relay 502 is opened and this relay retracts its armatures.

The deenergization of the relay 502 opens the circuit of the stepping magnet 534 and closes a circuit for the slow-acting relay 532. The relay 532 is energized and operates to establish a circuit for the relay 531. The latter relay, upon being energized, reestablishes the circuit of the stepping magnet 534. The stepping magnet 534 now intermittently operates to advance the wipers 555 to 558, inclusive, until they are brought into engagement with the twenty-fifth set of bank contacts.

During the second advancement of the wipers of the code-sending switch, each time the stepping magnet 534 operates, the circuit of the repeating relay 501 is opened and this relay retracts its armature to produce a corresponding number of interruptions in the circuit of the line relay 607 of the connector H—1. Upon each retraction of the armature 620 of the relay 607, the circuit of the stepping magnet 623 is opened and the magnet operates to advance the wipers 630 to 633, inclusive, into engagement with the bank contact set which corresponds to the number of impulses sent over the trunk line, as determined by the second movement of the wipers of the code-sending switch CD—1. It will be assumed that this contact set includes the bank contact 641.

When the wipers of the connector H—1 are brought into this position, no more impulses are sent over the trunk line until the slow-acting relays 533 and 532 of the code-sending switch CD—1 are deenergized. During the advancement of the switch wipers to their second position, when the wiper 631 engages the ninth, eleventh and thirteenth set of bank contacts, a circuit is completed for the relay 603.

The relay 603, upon being energized, closes a circuit for the slow-acting relay 601 at armature 611, at armature 612 prepares a circuit for maintaining itself energized, and at armature 613 removes battery from conductor 661. As a result of the termination of the second series of impulses, the slow-acting relay 603 in the connector H—1, which has been maintained energized by the operation of the armature 620 of the line relay 607, retracts its armatures, thereby opening the circuits of the slow-acting relay 601 at armature 611 and, at armature 613, completes a circuit which extends from battery by way of said armature and its back contact, conductor 661, winding of relay 705, conductor 657, bank contact 641, wiper 630, front contact and armature 608, and front contact and armature 617 to ground. The relay 705 is energized over this circuit and operates to establish a locking circuit for itself at armature 719, and to prepare a circuit at armature 720 for short-circuiting the relay 700.

As previously described, the code-sending switch CD—1 is stepped around to its twenty-fifth position after the termination of the second series of impulses. The wipers of the connector switch H—1 are also stepped in synchronism with the wipers of the code-sending switch CD—1 and are brought to rest in engagement with their twenty-fifth set of contacts.

In the code-sending switch CD—1, the operation of the wipers 555 to 558, inclusive, to their twenty-fifth set of bank contacts opens the circuit of the relay 527 and also the energizing circuit of the slow-acting relay 525. The relay 527 immediately retracts its armature. By reason of the peculiar construction of the armature 539, previously described, this armature vibrates for an interval of time, thus alternately closing the circuits of the slow-acting relays 526 and 525. For the reason explained previously, the relay 525 is the first to retract its armature. The deenergization of the relay 525 prepares a circuit for the relay 503.

Another result of the switch wipers of the code-sending switch CD—1 being brought into engagement with the twenty-fifth set of bank contacts is that a circuit is completed extending from ground by way of wiper 555, bank contact 560, and winding of relay 529 to battery. The relay 529 operates to open another point in the energizing circuit of the relay 525 at armature 544 and to close the circuit at the relay 503. Upon being energized, the relay 503 operates to establish another circuit for the relay 528 at armature 508, and to close a circuit at armature 507' which extends from ground by way of said armature and its front contact, wiper 511, bank contact 515, conductor 460, and winding of resistor 431 to battery. This circuit serves to short-circuit the relays 420 and 421. Consequently, these relays retract their armatures. The relay 420, upon retracting its armatures, opens its locking circuit at armature 423, also removes ground from common conductor 462 at armature 424, and at armature 425 removes one ground connection from conductor 464. The deenergization of the relay 421 causes this relay to open its locking circuit at armature 426 and to restore certain other circuits to normal.

In the connector H—1, the relay 602 is deenergized, because of the fact that the repeating relay 501 is retained energized for an interval after the wipers of the code-sending switch CD—1 engage the twenty-fifth set of bank contacts. Upon retracting its armature, the relay 602 closes a circuit which extends from ground by way of back contact and armature 610, conductor 660, armature 726 and its front contact, front contact and armature 720, and winding of resistor 712 to battery. This circuit serves to shunt out the relay 700 which retracts its armature. The latter operation opens the circuit of the supervisory lamp 715 and closes a circuit for the supervisory lamp 717. By reason of these changes in supervisory signals, the dispatcher is apprised of the change in position of the circuit interrupter 445 in the substation.

Returning now to the operation of the code-sending switch CD—1, the slow-acting relay 526 is finally deenergized and it opens the circuit of relay 501 at armature 537 and, at armature 538, it opens the circuit of the relay 530. The deenergization of the relay 530 opens the circuit of the slow-acting relay 532 at armature 546, and at armatures 547 and 548, completes a circuit that extends from ground by way of armature 548 and its back contact, winding of stepping magnet 534, armature 547 and its back contact, twenty-fifth bank contact with which wiper 558 is in engagement, said wiper, and back contact and armature 552 to battery. The stepping magnet 534 is energized over this circuit and operates to restore the wipers 555 to 558, inclusive, to their normal positions, whereupon the circuit of the magnet 534 is opened and its operation ceases.

As a result of the wipers of the code-sending switch being brought to their normal position, the circuit of the relay 529 is opened and this relay retracts its armatures to open the circuit of the relay 503. The slow-acting relay 532, upon retracting its armature, opens the circuit of the slow-acting relay 531 which is also deenergized. The relay 503, upon retracting its armatures, opens the circuit of the relay 528 at armature 508, and at armature 507' removes the shunt from the circuit of the relay 421. It will be remembered that the relay 422 is now in an operated position and, consequently, the relay 421 is energized to establish a locking circuit for itself at armature 426. The operation of the other armatures of the relay 421 is without effect at this time as the relay 420 is inert. The deenergization of the relay 528 in the code-sending switch CD—1 merely restores certain circuits to their normal condition. The deenergization of the relay 501, which occurred immediately after the deenergization of the slow-acting relay 526, opens the circuit of the line relay 607 of the connector H—1.

As the circuit of the relay 607 is opened, this relay is deenergized to open the circuit of the slow-acting relay 605. Upon retracting its armatures, the relay 605 closes a circuit for the stepping magnet 623 which extends from battery by way of wiper 632 of the twenty-fifth bank contact, back contact and armature 624, back contact and armature 618, and winding of stepping magnet 623 to ground. The stepping magnet 623 operates to restore the wipers 630 to 633, inclusive, to their normal position.

In the manner described above, the apparatus is released following the sending of the supervisory signal to the dispatcher, notifying him that the charging circuit of the battery B has been closed by an operation occurring in the substation.

It will be noted that the supervisory signal 717 is not actuated immediately after the two series of impulses which caused its selection. It is operated when the wipers of the connector H—1 are brought into their twenty-fifth position and remain there for an interval. By this circuit arrangement false operation of the supervisory signals is prevented because, should either the switch CD at the substation or the connector H—1 in the dispatcher's office get out of synchronism with the other, the wipers of each of the switches will not be in their twenty-fifth position simultaneously. Consequently, the supervisory signal will not be operated. The dispatcher seeing no change in the supervisory signals will operate the checking key with results described subsequently.

In the same manner as above described any change in position of any of the circuit interrupters, or other apparatus units, causes the finder switch F—1, the code-sending switch CD—1 and the connector H—1 to be operated to control the actuation of the supervisory signal.

Special provisions have been made whereby the load dispatcher is apprised of the condition of the battery B at the substation. This arrangement comprises a contact-making voltmeter V, that is adapted to close the contacts 490 and 491 when the voltage has reached the desired maximum value and the contacts 490 and 492 when the battery voltage has reached the allowable minimum value.

In order to briefly describe the operation, it will be assumed that the voltage of the battery B has been lowered sufficiently to bring the contact maker 490 in connection with the contact 492. This operation places ground upon conductor 493. This operation completes a circuit for a relay, such as 422. The operation of this relay causes the code-sending operation to be initiated in the same manner as above described. The change in supervisory signals at the dispatcher's office apprises the dispatcher of the low-condition of the battery and he may close the charging circuit of the battery B by the operation of the circuit interrupter 445, in a manner that will be described subsequently.

It will now be assumed that the voltage of the battery B is low and that the circuit interrupter 445 at the substation is open and the load dispatcher desires to close it to charge the battery. In order to accomplish this result, the dispatcher operates the double-throw key K in a direction to momentarily close the springs shown on the right.

The operation of the key K closes a circuit that extends from ground by way of spring 100 and its working contact, winding of relay 106, conductor 183, front contact and armature 713, to battery. The relay 106 is energized over this circuit and it operates to establish a locking circuit for itself at armature 104 over a path extending from ground by way of spring 177', and its resting contact, armature 104 and its front contact, winding of relay 106, conductor 183, and front contact and armature 713 to battery. The operation of the armature 173 of the relay 106 closes a circuit from the monitor lamp 125. This lamp remains lighted through the sending operation, even after the key K restores to normal, in order to inform the dispatcher that the desired code is being sent.

Another result of the energization of the relay 106 is that at armature 103 a circuit is completed that extends from ground by way of armature 103 and its working contact, winding of stepping magnet 109 of finder switch F, armature 132 and its back contact, and back contact and armature 120 to battery. As the stepping magnet 109 interrupts its own circuit, it operates as a buzzer to advance the switch wipers 123 to 126, inclusive, until they are brought into engagement with the bank contacts 127 to 130, inclusive, which is the contact set associated with the key K in the finder F.

When the switch wipers are brought into engagement with this set of bank contacts, a circuit is closed which extends from ground through the winding of relay 108 by way of common conductor 134, which is common to all the keys in the group, front contact and armature 101, bank contact 130, wiper 126 and coil of relay 113 to battery. The relay 113 is energized over this circuit and, upon operating, opens the circuit of the stepping magnet 109, thus stopping the operation of the finder switch, and closes a circuit for the relay 111 extending from battery by way of armature 120 and its front contact, through the coil of the relay 111, the bank contact with which the wiper 160 is in engagement, and said wiper to ground, and at armature 121 closes a circuit that extends from ground by way of armature 121 and its front contact, through the coil of the slow-acting relay 143, and armature 152 and its back contact to battery. The relay 111, upon being energized, closes a circuit for the slow-acting relay 110 at its armature 117.

The armature 117 of the relay 111 is constructed in a manner similar to the relay 527 of the code-sending switch CD—1 and, consequently, when the relay becomes de-energized, the armature 117 vibrates for an interval afterwards.

The relay 110, upon operating, at armature 115 closes a circuit for the relay 140, and at armature 116 establishes a circuit that extends from ground by way of armature 121 and its front contact, coil of repeating relay relay 144, front contact and armature 116, and armature 152 and its back contact to battery. The repeating relay 144, upon operating, at its armature 154 closes a bridge across the conductors 180 and 181 extending to the substation whereby the line relay 200 of the connector H is energized.

The line relay 200, upon operating, closes a circuit for the slow-acting relay 202 in parallel with the stepping magnet 207. The stepping magnet 207 is energized to place its associated pawl in position to actuate the switch shaft. The slow-acting relay 202, upon being energized, closes a circuit for the slow-acting relay 203. The latter relay operates to energize the slow-acting relay 206. The operations of these relays have the same functions as described in connection with the connector H—1.

Returning now to the operation of the code-sending switch CD, the relay 140, upon operating, at its armature 148 closes a circuit for the slow-acting relay 141. The relay 141, upon attracting its armature, establishes a circuit for the slow-acting relay 142. The latter relay, upon being energized, closes a circuit that extends from ground by way of armature 155 and its back contact, front contact and armature 151, front contact and armature 153, coil of magnet 146, wiper 162 and its associated bank contact, and armature 148 and its front contact to battery. The stepping magnet 146 is energized over this circuit and it operates to place its associated pawl in position to actuate the switch shaft and also to open the circuit of the relays 144 and 143 at the armature 152. The deenergization of the relay 144 opens the circuit of the line relay 200 of the connector H at the substation. The slow-acting relay 143, upon being deenergized, opens the circuit of the stepping magnet 136, which is also deenergized, to reestablish the circuit of the relays 143 and 144, and to advance the switch wipers 160 to 163, inclusive, into engagement with their first set of bank contacts.

The stepping of the code-sending switch CD continues under the control of the slow-acting relay 143 until the wipers of the switch are brought into engagement with the contact set which includes the contact 164. When this occurs, a circuit is completed that extends from ground by way of armature 103 of relay 106 and its front contact, wiper 125, bank contact 129, bank contact 165, wiper 161, and coil of relay 145 to battery.

The relay 145 is energized over this circuit and, upon operating, opens the circuit of the stepping magnet 146 at armature 155, at the front contact of this armature prepares another circuit for the magnet, and at armature 156 opens the circuit of the slow-acting relay 141. The rotation of the switch, of course, ceases.

The slow-acting relay 141, upon being deenergized, opens the circuit of the slow-acting relay 142. After a short interval, the slow-acting relay 142 retracts its armature and closes a circuit that extends from ground by way of armature 155 and its front contact, back contact and armature 151, front contact and armature 153, coil of stepping magnet 146, wiper 162 and bank contact with which said wiper is in engagement, and front contact and armature 148 to battery. The stepping magnet 146 operates to attract its armature, thereby placing the pawl in actuating position and opening the circuit of the slow-acting relay 143 and also the circuit of the relay 144.

In accordance with the first operation of the code-sending switch CD, a series of interruptions is produced in the circuit of the line relay 200 of the connector H. This relay is deenergized a plurality of times in response thereto. As a result of the retractions of the armature 209, the circuits of the slow-acting relay 202 and the magnet 207 are opened. The deenergizations of the magnet 207 serve to advance the switch wipers 225 to 228, inclusive, in engagement with the bank contact set which corresponds to the number of impulses sent over the trunk line and, consequently, the position of the wipers 160 to 163, inclusive, of the code-sending switch CD. At the first off-normal step of the switch, the relay 201 is energized to ground the conductor 260. It will be assumed that the bank contact set to which the wipers 225 to 228, inclusive, are stepped includes the bank contact 230.

During the interval that the slow-acting relays 141 and 142 in the code-sending switch are being deenergized, the slow-acting relay 203 of the connector H, which has been maintained energized by the continued operation of the armature 209 is deenergized. As a result of this operation, a circuit is completed that extends from ground by way of armature 211 and its front contact, armature 221 and its front contact, wiper 225, bank contact 230, conductor 262, coil of relay 306, conductor 271, and armature 215 and its back contact to battery. The relay 306 is energized over this circuit and operates to close a locking circuit for itself at armature 322 to ground on conductor 260.

Adverting to the operation of the code-sending switch CD, the deenergization of the slow-acting relay 142 closes a circuit for the magnet 146 which is energized to place its associated pawl in actuating position and to open the circuit of the slow-acting relay 143 and also the circuit of the repeating relay 144. The slow-acting relay 143, upon being deenergized, opens the circuit of the stepping magnet 146, which is deenergized. The retraction of the armatures of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-acting relay 141. The energization of the relay 141 closes the circuit of the relay 142.

The operation of the relay 142 again starts the operation of the stepping magnet 146. The magnet 146 is now intermittently operated to advance the wipers 160 to 163, inclusive, into engagement with the bank contact set, which includes the contact 166. A circuit is now closed that extends from ground by way of armature 103 of relay 106 and its front contact, armature 119 of relay 108 and its front contact, wiper 124, bank contact 128, bank contact 166, wiper 161, and winding of relay 145 to battery. The relay 145 is energized to momentarily stop the operation of the switch wipers in the same maner as before described.

The repeating relay 144 operates to interrupt the circuit at the line relay 200 of the connector H in the same manner as before. The line relay 200 operates to control the operation of the stepping magnet 207 in advancing the wipers 225 to 228, inclusive, into engagement with the proper bank contact set, which, it will be assumed, includes the bank contact 231. At the termination of this series of impulses, the slow-acting relay 204, which has been energized while the switch wipers were being rotated past the ninth, eleventh and thirteenth set of bank contacts and has been maintained energized by the operation of the line relay 200, is deenergized and a circuit is closed that extends from ground by way of front contact and armature 211, armature 221 and its front contact, wiper 225, bank contact 231, conductor 268, winding of relay 303, conductor 270 and armature 219 and its front contact to battery. The relay 303 is operated over this circuit and attracts its armatures to establish a locking circuit for itself at armature 350 and to prepare a circuit, at armature 319, for the relay 404 at the substation.

Going back now to the operation of the code-sending switch CD, the slow-acting relays 141 and 142 operate, as before, and the magnet 146 is operated after an interval to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed that extends from ground by way of wiper 160 and its associated twenty-fifth bank contact, and winding of relay 112 to battery. The relay 112 is energized to prepare a circuit for the stepping magnet 109, the function of which will be described subsequently. Another result of the rotation of the wipers to the twenty-fifth position is that the circuit of the relay 111 is opened. The relay 111 is immediately deenergized to cause its armature 117 to vibrate. The relay 110 is thus maintained energized for an interval after the relay 111 is deenergized. In the same manner as before described, the wipers of the connector H are brought into engagement with their twenty-fifth set of bank contacts.

During the interval that the relay 110 in the dispatcher's office is maintained energized, the slow-acting relay 205 in the connector H at the substation is deenergized and a circuit is completed that extends from battery by way of the back contact and armature 220, conductor 269, conductor 372, winding of relay 404, conductor 371, armature 319 and its front contact, and armature 323 and its front contact to ground. The relay 404 is operated over this circuit and closes a circuit at its armature 416 for the closing coil of the circuit interrupter 445, and at armature 415 closes a circuit for the relays 420 and 421.

It has been assumed that circuit breaker 445 is open and has been operated to closed position. When this happens, an energizing circuit is completed for the relay 422 over the pallet switch of the circuit breaker 445. As a result of the energization of the relay 422, an energizing circuit is completed for the relay 421, over the front contact and armature 429, to battery. Relay 420 is also energized, over a circuit including the front contact and armature 418 and the front contact and armature 429, to battery and ground.

There is a slight difference in the operation in this instance, however, inasmuch as the relay 106 is locked energized, when the lamp 717 is lighted by the deenergization of the relay 700. The relay 700, upon retracting the armature 713, causes the relay 106 to deenergize.

The deenergization of the relay 106 opens the operating circuits of the finder switch F and the code-sending switch CD insuring that the operating code will not be sent to the substation again.

The contact 415 on the relay 404 at the substation is provided so that, in case the contactor 445 should already be in a closed position, an answer-back signal will be given to the dispatcher in order to check the supervisory signals.

The locking relay 106 also provides means whereby, if, for some reason or other, the code is not transmitted properly, the operation will occur repeatedly until the corresponding contactor or apparatus unit is operated in the substation. By the conjoint action of the checking contact 415 of the relay 404 at the substation and the locking relay 106 associated with the key K, provision is made so that, if the answer-back code is not transmitted properly, it will be sent back repeatedly until the proper indication is given to the load dispatcher.

As was described in detail above, the supervisory code, indicating the operation of the apparatus units, is started into operation following the energization of the relay 404 and the operation of the circuit breaker 445. It will also be recalled that, upon closing the operating key, the relay 106 was energized and locked. As a result, the code sender at the office remains in operating condition to repeatedly transmit the code for closing the circuit breaker until a signal is received from the substation which deenergizes the relay 106, as was described in detail above. Upon deenergization of the relay 106, the code-sending apparatus at the office is restored to normal. If, on the other hand, the code received from the remote station is not correctly received, the relay 106 will not be deenergized and, as a result, the code will be repeatedly transmitted to the office until the supervisory code is correctly received for deenergizing the relay 106 to permit restoration of the apparatus to normal.

Referring again to the operation of the code-sending switch CD, it will be remembered that the circuit of the slow-acting relay 110 is finally opened by the cessation of the vibration of the armature 111. The relay 110, upon being deenergized, opens the circuit of the slow-acting relay 140 at armature 115, at armature 116 opens the circuit of relay 144, and at armature 114 closes a circuit that extends from battery by way of front contact and armature 118, armature 114 and its back contact, back contact and armature 122, winding of stepping magnet 109, and front contact and armature 172 to ground. The magnet 109 is operated over this circuit to advance the wipers 123 to 125, inclusive.

The slow-acting relay 140, upon being deenergized, opens the circuit of the slow-acting relay 141 and closes a circuit that extends from ground by way of armature 147 and its back contact, winding of stepping magnet 146, armature 149 and its back contact, bank contact with which wiper 163 is in engagement and said wiper, and armature 152 and its back contact to battery. The magnet 146 operates to restore the wipers 160 to 163, inclusive, to normal position. By this operation, the circuit of the relay 112 is opened and this relay is deenergized to open the circuit of the stepping magnet 109 of the finder switch F, whereby the rotation of the wipers of the finder switch ceases. The slow-acting relay 141, upon retracting its armature, opens the circuit of the slow-acting relay 142, which is also deenergized. In the above manner, the connection is released responsive to transmitting of the sending operation.

The reason that the finder switch F is given a number of steps at the end of the code transmitting operation is to allow the calls to be evenly distributed over the group of keys. To explain more fully, assuming that another relay, such as 106, is operated in addition to the said relay, by the momentary operation of another key K, were it not for the provision mentioned, the code corresponding to the operated relay would be transmitted indefinitely until the proper answer-back signal were recorded on the lamps, and there would be no actuating code sent out for the other relay, which was operated. By means of the circuit arrangement shown, this difficulty is obviated and one transmitting operation cannot indefinitely tie up the remaining operations.

The relay 113, of course, is deenergized as soon as the switch wiper 126 is rotated from engagement with the back contact 130 and the circuit of the stepping magnet 109 is closed. If no other relay, such as 105 or 106, is operated, the finder switch F may again rotate the wipers 123 to 126, inclusive, into engagement with the bank contacts 127 to 130, inclusive.

In case the dispatcher momentarily operates the key K in the other direction, thus operating the springs shown at the left, the relay 105 is locked energized and the code for opening the contactor is sent out, although the wipers 123 to 126, inclusive, of the finder switch F are brought into engagement with the bank contacts 127 to 130, inclusive. The difference in the code is due to the fact that the common relay 108 is not energized at this time, and, consequently, the wipers of the code-sending switch CD are first stopped in engagement with the bank contact set which includes the contact 164.

The operation of the code-sending switch, occasioned by the position of the key K, brings about the operation of the connector switch H—1 in the same manner as before. The operation of the connector switch H—1 causes the energization of the relay 435 with the result that the circuit interrupter 445 is opened to open the charging circuit of the battery B.

The release of the selecting apparatus occurs in the same manner as before, it being obvious that the opening of the circuit interrupter 445 causes the code to be sent back to the dispatcher's office to apprise the dispatcher of this condition.

If the charging circuit of the battery B remains closed until the voltage of the battery attains a predetermined maximum value, the contact-making member 490 is forced into engagement with the contact-making member 491, whereby the relay 494 is operated to close the circuit for the opening coil of the circuit interrupter 445. The opening of the circuit interrupter causes the code to be sent back to the dispatcher's office to apprise the dispatcher of the fully charged condition of the battery, in an obvious manner.

The dispatcher is also provided with a checking key whereby it is possible for him to send out a certain code which will operate the relays 401, 402 and 403. These relays carry contacts for closing the circuits of all relays, such as relays 420 and 421, in the substation. Consequently, when the checking code is sent out, all the apparatus units codes will be sent back to the dispatcher in order to check his supervisory signals.

Under certain conditions, it will be seen that it may be desirable to operate a plurality of contactors, or other apparatus units, in the substation simultaneously in order to take care of standard operations or emergency conditions. To this end, I have provided a relay 435 which is adapted to close circuits at the armatures 432, 434 and 433' for the contactors that it is desired to operate. The relay 435 is energized in the same manner as the relay 404. The operation of this relay and the contactors controlled by it will be apparent without further explanation.

My invention is not limited to the particular arrangement of the apparatus described, but may be variously modified without departing from the spirit and scope thereof, as set forth in the appended claims.

I claim as my invention:

1. In a supervisory control system, a first station, a second station, a plurality of apparatus units at said second station, a storage battery at said second station, signaling devices individual to said apparatus units at said first station and a signaling device individual to said storage battery at said first station, a finder switch at said second station comprising a contact individual to each of said apparatus units and said battery, a code sender at said second station, said finder switch and said code sender being normally in a non-operative condition, means responsive to a change in said battery condition to a predetermined condition for operating said finder switch to the contact individual to said battery, means responsive to the operation of said switch to said contact for starting said code sender into operation for transmitting a code combination of impulses individual to said storage battery and its new condition, said code sender being also arranged to transmit code combinations of impulses individual to each of said other apparatus units in the event that said apparatus units operate said finder switch to their individual contacts and means at said first station responsive to said code combination of impulses individual to said storage battery condition for operating a signaling device individual to said storage battery whereby said dispatcher is apprised of the condition of said storage battery.

2. In a supervisory control system, a first station, a second station, a plurality of apparatus units at said second station, a storage battery at said second station, signaling devices individual to said apparatus units at said first station and a signaling device individual to said storage battery at said first station, a finder switch at said second station comprising a contact individual to each of said apparatus units and said battery, a code sender at said second station, said finder switch and said code sender being normally in a non-operative condition, means responsive to a change in said battery condition to a predetermined condition for operating said finder switch to the contact individual to said battery, means responsive to the operation of said switch to said contact for starting said code sender into operation, for transmitting a code combination of impulses individual to said storage battery and its new condition, said code sender being also arranged to transmit code combinations of impulses individual to each of said other apparatus units in the event that said apparatus units operate said finder switch to their individual contacts, means at said first station responsive to said code combination of impulses individual to said storage battery condition for operating a signaling device individual to said storage battery whereby said dispatcher is apprised of the condition of said storage battery, and means at said first station for selectively controlling the charging of said storage battery at said second station.

3. In a supervisory control system, a first station, a second station, a plurality of apparatus units at said second station, a storage battery at said second station, signaling devices individual to said apparatus units at said first station and a signaling device individual to said storage battery at said first station, a finder switch at said second station comprising a contact individual to each of said apparatus units and said battery, a code sender at said second station, said finder switch and said code sender being normally in a non-operative condition, means responsive to a change in said battery condition to a predetermined condition for operating said finder switch to the contact individual to said battery, means responsive to the operation of said switch to said contact for starting said code sender into operation, for transmitting a code combination of impulses individual to said storage battery and its new condition, said code sender being also arranged to transmit code combinations of impulses individual to each of said other apparatus units in the event that said apparatus units operate said finder switch to their individual contacts, means at said first station responsive to said code combination of impulses to said storage battery condition for operating a signaling device individual to said storage battery whereby said dispatcher is apprised of the condition of said storage battery, a source of electrical energy at said second station, means for connecting said storage battery to said source of energy and means at said first station for selectively operating said last mentioned means to connect said storage battery to said source of energy.

4. In a supervisory control system, a first station, a second station, a plurality of apparatus units at said second station, a storage battery at said second station, signaling devices individual to said apparatus units at said first station and a signaling device individual to said storage battery at said first station, a finder switch at said second station comprising a contact individual to each of said apparatus units and said battery, a code sender at said second station, said finder switch and said code sender being normally in a non-operative condition, means responsive to a change in said battery condition to a predetermined condition for operating said finder switch to the contact individual to said battery, means responsive to the operation of said switch to said contact point for starting said code sender into operation for transmitting a code combination of impulses individual to said storage battery and its new condition, said code sender being also arranged to transmit code combinations of impulses individual to each of said other apparatus units in the event said apparatus units operate said finder switch to their individual contacts, means at said first station responsive to said code combination of impulses individual to said storage battery condition for operating a signaling device individual to said storage battery whereby said dispatcher is apprised of the condition of said storage battery, a finder switch and code sender at said first station, said finder switch and code sender being normally in a non-operative condition, a source of energy at said second station, means for controlling the connections of said storage battery to said source of energy, means including said finder switch and said code sender at said first station for transmitting a code combination of impulses to said second station and means at said second station responisve to said code combination of impulses for operating said storage battery control means to connect said storage battery to said source of energy.

In testimony whereof, I have hereunto subscribed my name this 24th day of November, 1924.

THOMAS U. WHITE.